US012558705B2

(12) United States Patent
Im et al.

(10) Patent No.: US 12,558,705 B2
(45) Date of Patent: Feb. 24, 2026

(54) POLYMER FILM USING CHEMICAL VAPOR DEPOSITION USING SULFUR AS INITIATOR (sCVD), METHOD OF PREPARING THE SAME AND APPARATUS FOR PREPARING THE SAME

(71) Applicant: KOREA ADVANCED INSTITUTE OF SCIENCE AND TECHNOLOGY, Daejeon (KR)

(72) Inventors: Sung Gap Im, Daejeon (KR); Doheung Kim, Daejeon (KR); Wontae Jang, Daejeon (KR); Keonwoo Choi, Daejeon (KR)

(73) Assignee: KOREA ADVANCED INSTITUTE OF SCIENCE AND TECHNOLOGY (KR)

(*) Notice: Subject to any disclaimer, the term of this patent is extended or adjusted under 35 U.S.C. 154(b) by 929 days.

(21) Appl. No.: 17/057,681

(22) PCT Filed: Sep. 15, 2020

(86) PCT No.: PCT/KR2020/012422
§ 371 (c)(1),
(2) Date: Nov. 22, 2020

(87) PCT Pub. No.: WO2021/167194
PCT Pub. Date: Aug. 26, 2021

(65) Prior Publication Data

US 2022/0305524 A1 Sep. 29, 2022

(30) Foreign Application Priority Data

Feb. 21, 2020 (KR) ........................ 10-2020-0021570
Aug. 4, 2020 (KR) ........................ 10-2020-0097375

(51) Int. Cl.
*B05D 1/00* (2006.01)
*C08G 75/14* (2006.01)
(Continued)

(52) U.S. Cl.
CPC ...................................... *B05D 1/60* (2013.01)

(58) Field of Classification Search
CPC .... B05D 1/60; B05D 2202/15; C08G 75/045; C08G 75/14; C08G 75/16; C08L 81/04;
(Continued)

(56) References Cited

U.S. PATENT DOCUMENTS

2003/0138645 A1 7/2003 Gleason
2014/0199592 A1* 7/2014 Pyun .................. H01M 4/0404 252/511
(Continued)

FOREIGN PATENT DOCUMENTS

KR 1020080026195 A 3/2008
KR 101549116 B1 8/2015
(Continued)

OTHER PUBLICATIONS

Chung, W.J., et al., "The use of elemental sulfur as an alternative feedstock for polymeric materials", "Nature Chemistry", Apr. 14, 2013, pp. 518-524, vol. 5, No. 6, Publisher: Macmillan Publishers Limited.
(Continued)

*Primary Examiner* — Maria V Ewald
*Assistant Examiner* — Daniel P Dillon
(74) *Attorney, Agent, or Firm* — HULTQUIST, PLLC; Steven J. Hultquist

(57) ABSTRACT

The present invention relates to a method of preparing a polymer film using chemical vapor deposition using sulfur as an initiator (sCVD) capable of manufacturing a polymer film through polymerization of sulfur and a monomer using
(Continued)

gas-phase sulfur as an initiator. In the manufactured polymer film, any of various monomers and sulfur can be polymerized into a copolymer, and it is possible to manufacture a polymer film having a high content of sulfur, an excellent refractive index, and excellent transmittance.

7 Claims, 6 Drawing Sheets

(51) Int. Cl.
*C08L 81/04* (2006.01)
*C23C 16/448* (2006.01)

(58) Field of Classification Search
CPC .. C23C 16/4488; C08F 212/14; C08F 212/16; C08F 212/26; C08F 212/36; C08F 228/02; C08F 8/34; G02B 1/041
USPC .......................................................... 428/220
See application file for complete search history.

(56) References Cited

U.S. PATENT DOCUMENTS

2021/0193388 A1 * 6/2021 Qi .......................... H01G 4/018
2021/0231943 A1 * 7/2021 Bellman .................. G02B 3/14

FOREIGN PATENT DOCUMENTS

KR 1020170019244 A 2/2017
KR 1020180097002 A 8/2018
KR 101900483 B1 9/2018
WO WO-2019071396 A1 * 4/2019 ................ C08J 5/18

OTHER PUBLICATIONS

Griebel, J., et al., "New Infrared Transmitting Material via Inverse Vulcanization of Elemental Sulfur to Prepare High Refractive Index Polymers", "Advanced Materials", 2014, pp. 3014-3018, vol. 26, No. 19, Publisher: WILEY VCH-Verlag Gmbh & Co.

* cited by examiner

【FIG. 1】
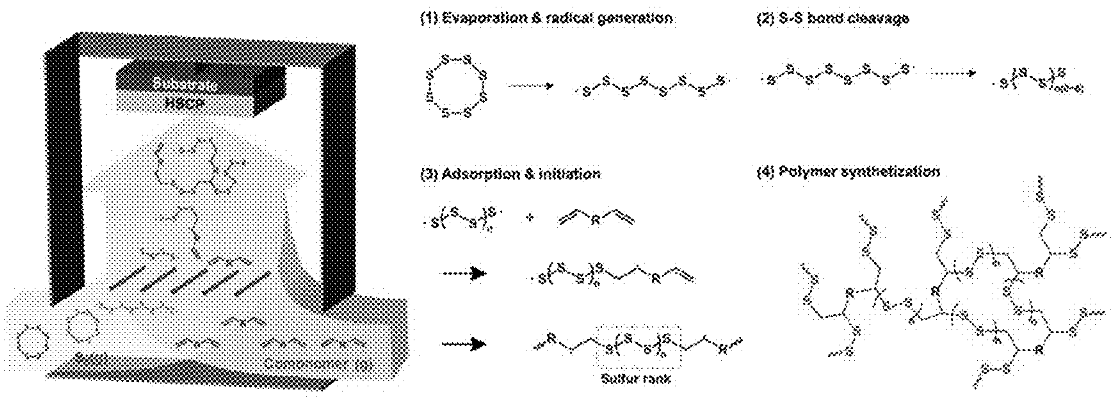
【FIG. 2a】
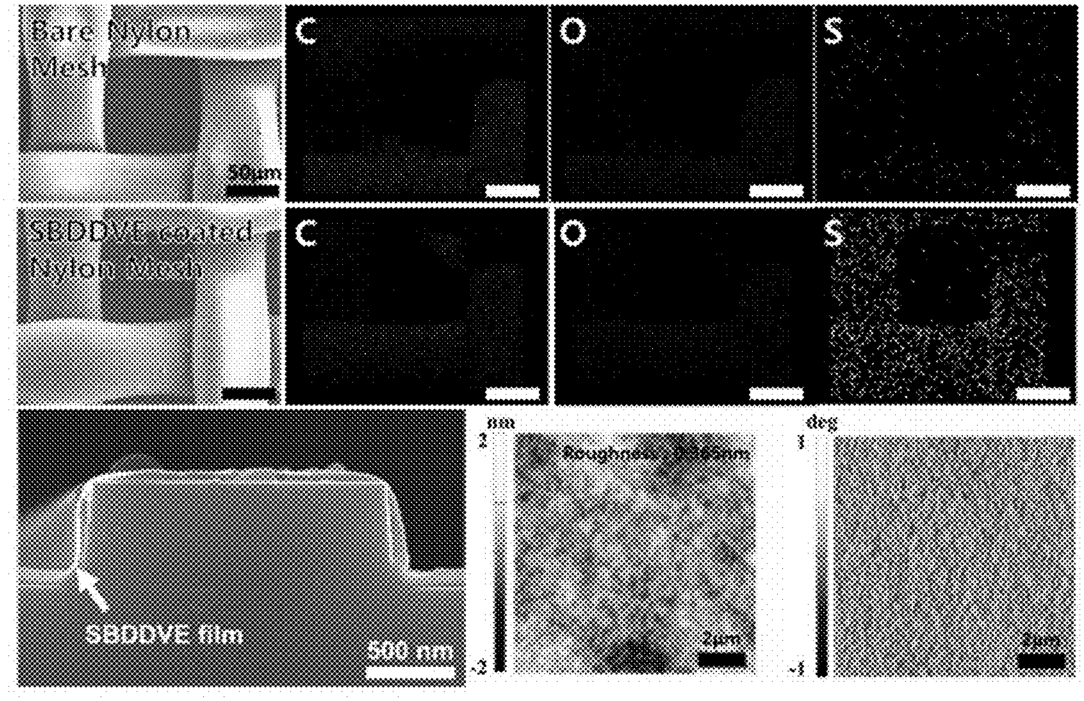

【FIG. 2b】
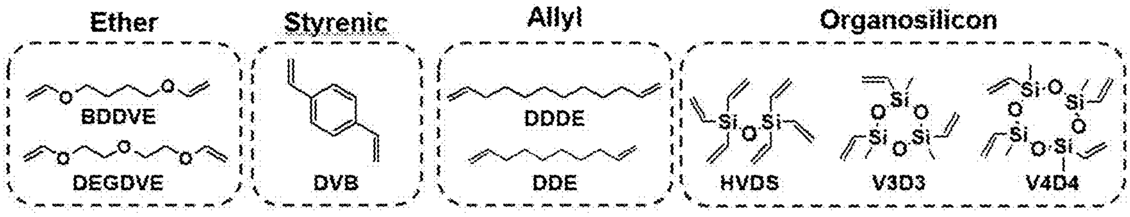

【FIG. 3】
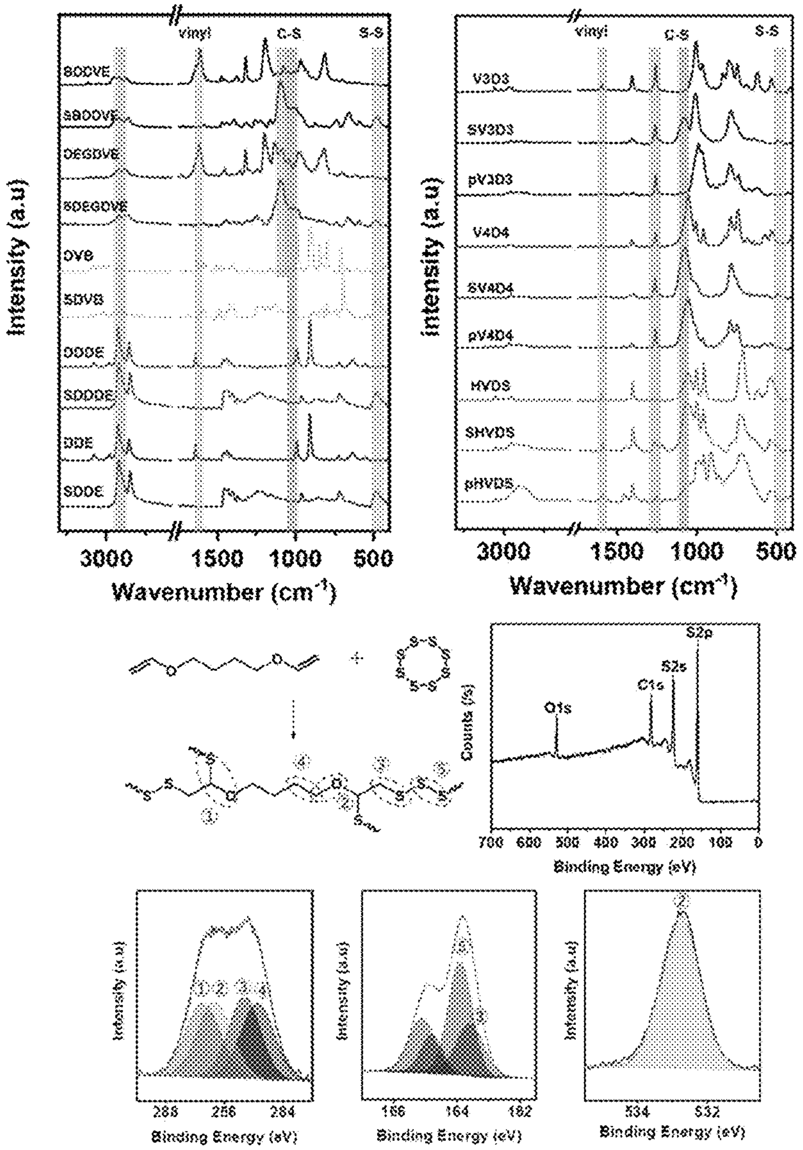

【FIG. 4】
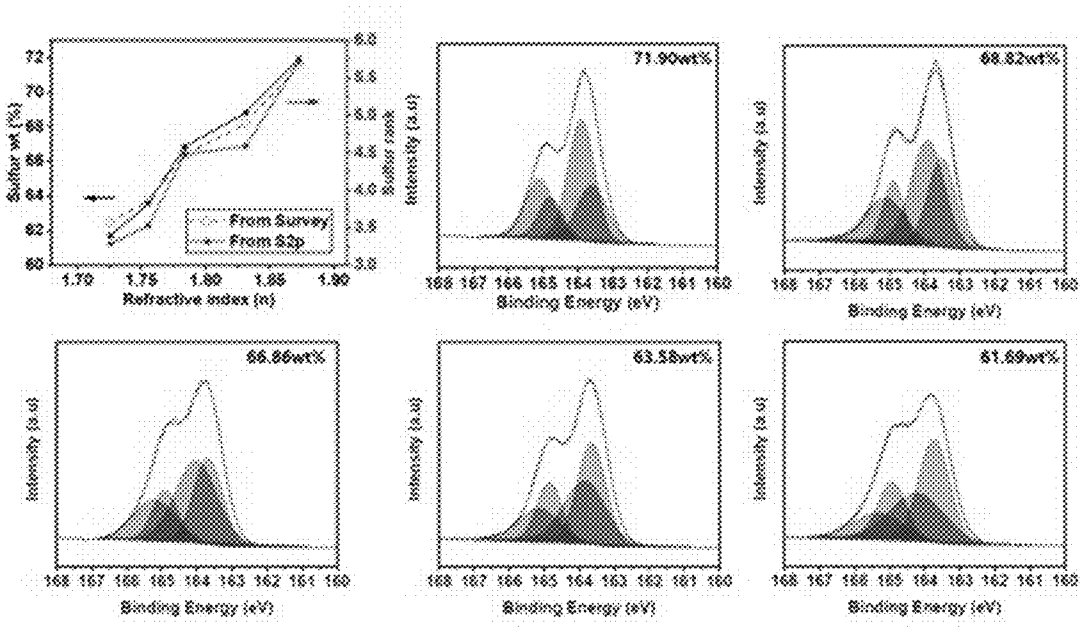

【FIG. 5】
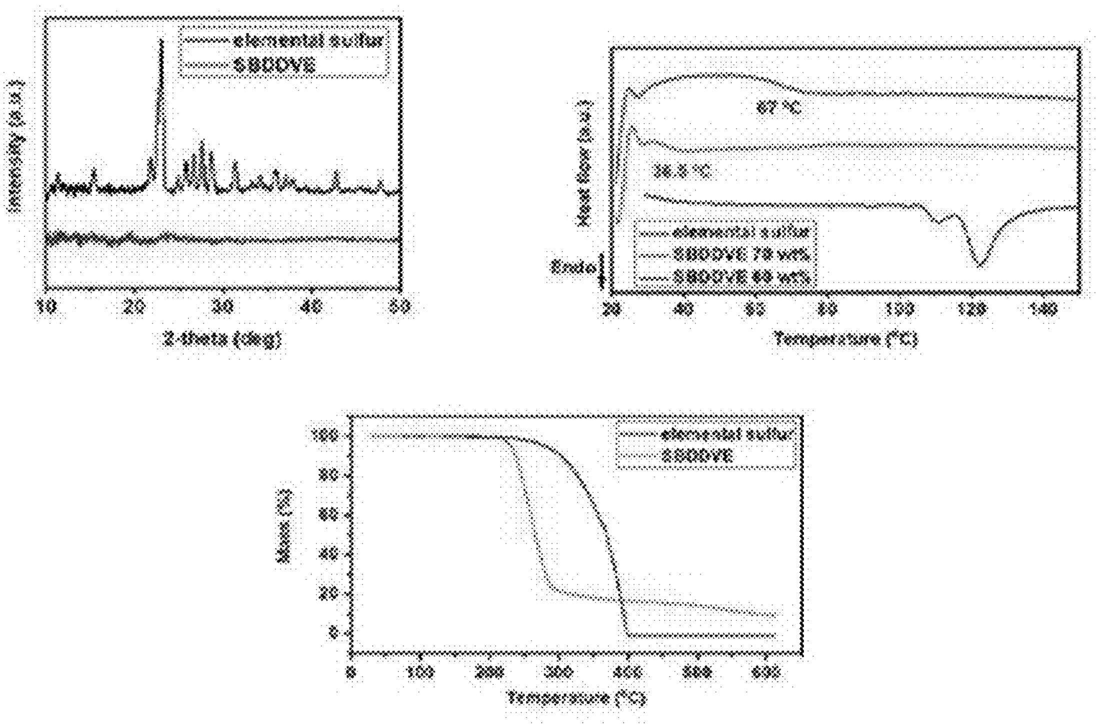
【FIG. 6】
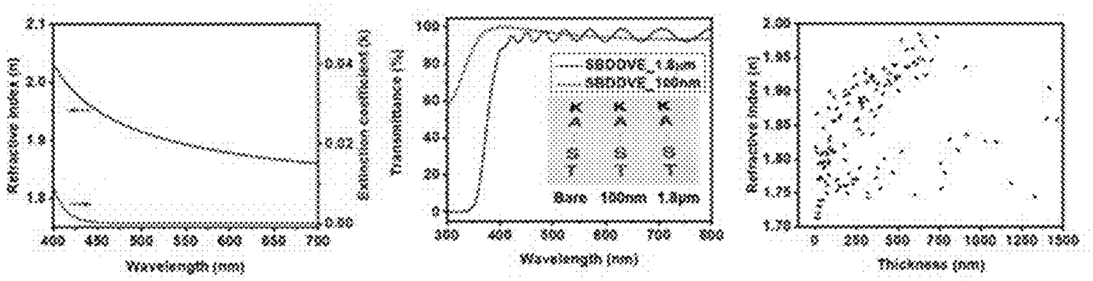

【FIG. 7】
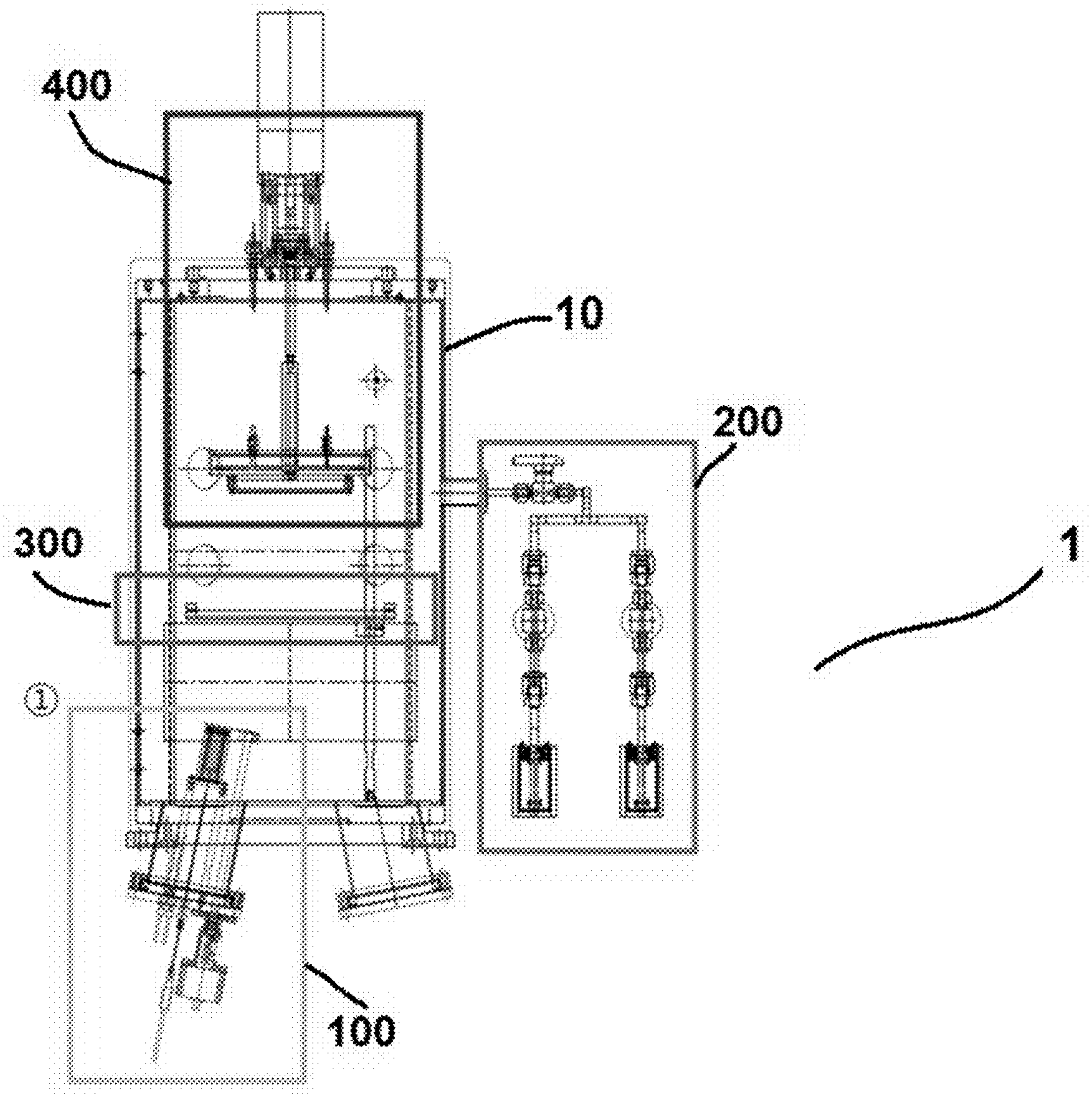

POLYMER FILM USING CHEMICAL VAPOR DEPOSITION USING SULFUR AS INITIATOR (sCVD), METHOD OF PREPARING THE SAME AND APPARATUS FOR PREPARING THE SAME

CROSS-REFERENCE TO RELATED APPLICATIONS

This application is a U.S. national phase under the provisions of 35 U.S.C. § 371 of International Patent Application No. PCT/KR2020/012422 filed Sep. 15, 2020, which in turn claims priority under 35 U.S.C. § 119 of Korean Patent Application No. 10-2020-0097375 filed Aug. 4, 2020 and priority under 35 U.S.C. § 119 of Korean Patent Application No. 10-2020-021570 filed Feb. 21, 2020. The disclosures of such international patent application and Korean priority applications are hereby incorporated herein by reference in their respective entireties, for all purposes.

TECHNICAL FIELD

The present invention relates to a polymer film using chemical vapor deposition using sulfur as an initiator (sCVD), a manufacturing method thereof, and a manufacturing apparatus therefor, and more particularly to a polymer film using chemical vapor deposition using sulfur as an initiator (sCVD) capable of thoroughly mixing sulfur with various monomers using gas-phase sulfur as an initiator and depositing a polymer through polymerization, whereby it is possible to manufacture a polymer film having an excellent refractive index and transmittance, a manufacturing method thereof, and a manufacturing apparatus therefor.

BACKGROUND ART

In a crude oil refinement process throughout the world, a very large amount of sulfur, e.g. about 6 million tons of sulfur, is generated. In recent years, sulfur has attracted attention due to excellent optical properties of sulfur and excellent physical properties of sulfur as an electrode material of a lithium-sulfur battery, and shows promise for utilization in various fields. In spite of richness and excellent physical properties thereof, sulfur is limited in applicability to actual industries due to the following two problems. First is a problem in processability. When sulfur is heated to 160° C. or higher to melt the sulfur into a liquid phase, the sulfur becomes a thermoplastic material. When temperature is lowered to cool the sulfur, however, the sulfur is fragile, is coarse, and has low solubility, whereby there is difficulty in processing the sulfur. Second is a problem in stability. Sulfur has eight sulfur atoms forming a ring structure, and this structure is very stable and thus exhibits a phenomenon in which the sulfur returns back to an $S_8$ form even after processing. Consequently, there is a need for a scheme for solving this problem and reducing sulfur to a more valuable material.

In recent years, a new method called "inverse vulcanization" has been suggested as a scheme for reusing sulfur. Sulfur is heated to 160° C. or higher to form liquid-phase radicals, and the liquid-phase radicals are mixed with a liquid-phase monomer, whereby a sulfur-based plastic material having a network structure that has a high content of sulfur is obtained. Plastic having a stable form without the fragility of sulfur even after being cooled was developed through polymerization of a polymer in a crosslinked state. As a result, success was achieved in synthesis of a sulfur containing polymer utilizable in various fields, such as those of optical lenses, Li—S batteries, and heavy metal adsorption, and this was disclosed in a patent and several journal articles related thereto (US Patent Application Publication No. US20140199592; Chung, Woo Jin, et al., Nature Chemistry 5.6 (2013): 518-524; Griebel, Jared J., et al.; Advanced Materials 26.19 (2014): 3014-3018). In the conventional art serving as a reference, diisopropenylbenzene was used as a monomer, and success was achieved in synthesizing a sulfur containing polymer having a sulfur content of 70% or more. The performance of Li—S batteries was improved using the synthesized sulfur containing polymer, and the synthesized sulfur containing polymer was utilized in manufacturing a lens having high transmittance and a high refractive index in an IR zone. However, conventional research encountered the following major problems:liquid-phase sulfur and a monomer must be mixed during processing; a sulfur rank in a synthesized sulfur containing polymer sulfur containing polymer is high, whereby long-term stability is low; and a red color appears due to wavelength extinction in the visible spectrum. As a result, the synthesized sulfur containing polymer sulfur containing polymer is only limitedly applicable to various applications, and therefore there is a need for improvement thereof.

As a result of a variety of extensive and intensive studies and experiments to solve the problems described above, the inventors of the present application have found that, in the case in which a polymer film is manufactured by depositing a polymer through polymerization of sulfur and a monomer using a chemical vapor deposition process using gas-phase sulfur as an initiator, i.e. an sCVD process, it is possible to manufacture a polymer that is capable of being polymerized with a monomer having low miscibility with sulfur and has a low sulfur rank, whereby it is possible to manufacture a polymer having a very high refractive index and transmittance. The present invention has been completed based on these findings.

DISCLOSURE

Technical Problem

It is an object of the present invention to provide a method of preparing a polymer film using chemical vapor deposition using sulfur as an initiator (sCVD) capable of manufacturing a polymer that has no unreacted sulfur, facilitates mixing of a monomer and sulfur, and has a low sulfur rank, thereby having a very high refractive index and transmittance, a polymer film manufactured by the method, and an apparatus for manufacturing the polymer film.

Technical Solution

In accordance with an aspect of the present invention, the above object can be accomplished by the provision of a method of preparing a polymer film using chemical vapor deposition using sulfur as an initiator (sCVD), the method including: (a) introducing a gas-phase monomer and solid-phase sulfur into an sCVD reactor; (b) vaporizing the solid-phase sulfur by heating to obtain gas-phase sulfur and mixing the gas-phase sulfur and the monomer; and (c) heating a substrate to adsorb and polymerize the sulfur and the monomer on the substrate, and thereby depositing a sulfur-containing polymer on the substrate.

In accordance with another aspect of the present invention, there is provided a polymer film of a sulfur-containing polymer, wherein the polymer film has a refractive index of 1.7 to 1.9, a transmittance of 90 to 99.9% in a visible spectrum, a sulfur content of 60 to 80 wt %, and a sulfur rank of 2.0 to 8.0, and is coated with a sulfur containing polymer selected from the group consisting of poly(sulfur-co-1,4-butanediol divinyl ether) (SBDDVE), poly(sulfur-co-di(ethylene glycol)divinyl ether) (SDEGDVE), poly(sulfur-co-divinyl benzene) (SDVB), poly(sulfur-co-1,9-decadiene) (SDDE), poly(sulfur-co-1,11-dodecadiene) (SDDDE), poly (sulfur-co-1,3,5-trivinyl-1,3,5-trimethyl cyclotrisiloxane) (SV3D3), poly(sulfur-co-1,3,5,7-tetravinyl-1,3,5,7-tetramethylcyclotetrasiloxane) (SV4D4), and poly(sulfur-co-hexavinyldisiloxane) (SHVDS), the sulfur containing polymer having a thickness of 1 nm to 10 μm.

In accordance with a further aspect of the present invention, there is provided an apparatus (1) for manufacturing a polymer film using chemical vapor deposition using sulfur as an initiator (sCVD), the apparatus including: (a) an sCVD reactor (10); (b) a sulfur loading source cell (100) installed at the lower end of the sCVD reactor (10), the sulfur loading source cell (100) being configured to load solid-phase sulfur into the reactor (10), the sulfur loading source cell (100) being heated to vaporize sulfur during processing; (c) a monomer loading unit (200) connected to the upper end of the sCVD reactor (10), the monomer loading unit 200 being configured to heat an introduced monomer such that the monomer has sufficient vapor pressure and to move the gas-phase monomer into the sCVD reactor (10); (d) a filament (300) made of a high-temperature metal alloy wire, the filament (300) being configured to lower a sulfur rank of the gas-phase sulfur vaporized from the sulfur loading source cell (100) and to move the vaporized sulfur to a substrate (400); and (e) the substrate (400) being mounted such that the upper surface of the substrate (400) faces the lower part of the sCVD reactor (10), the monomer moved from the monomer loading unit (200) of (c) into the sCVD reactor (10) being adsorbed on the upper surface of the substrate (400), whereby a synthesis reaction between the vaporized sulfur and a polymer is performed on the substrate (400).

DESCRIPTION OF DRAWINGS

FIG. 1 is a view generally showing an sCVD process schematic diagram according to an embodiment of the present invention.

FIG. 2A is a view showing an SEM & EDS sectional image (a) and an AFM image (b) in which SBDDVE is deposited on a nylon mesh according to an embodiment of the present invention.

FIG. 2B is a list of monomers used in sCVD according to an embodiment of the present invention.

FIG. 3 is a view showing the results of FT-IR and XPS analyses of a sulfur containing polymer synthesized using sCVD in accordance with an embodiment of the present invention.

FIG. 4 is a graph showing sulfur rank in a polymer through the results of XPS analysis of a sulfur containing polymer synthesized using sCVD according to an embodiment of the present invention.

FIG. 5 is a view showing the results of XRD, DSC, and TGA analyses of a sulfur containing polymer synthesized using sCVD in accordance with an embodiment of the present invention.

FIG. 6 is a graph showing refractive index and extinction coefficient (left), transmittance (middle), and thickness vs. average refractive index (the average refractive index value of 400 nm to 700 nm) (right) of a sulfur containing polymer synthesized using sCVD according to an embodiment of the present invention.

FIG. 7 is a sectional view of an apparatus 1 for manufacturing a polymer film using chemical vapor deposition using sulfur as an initiator (sCVD) according to an embodiment of the present invention.

DESCRIPTION OF REFERENCE NUMERALS

1: sCVD manufacturing apparatus
10: sCVD reactor
100: Sulfur loading source cell
200: Monomer loading unit
300: Filament
400: Substrate

BEST MODE

Unless defined otherwise, all technical and scientific terms used herein have the same meanings as appreciated by those skilled in the field to which the present invention pertains. In general, the nomenclature used herein is well-known in the art and is ordinarily used.

In the present invention, it was confirmed that, in the case in which a polymer film is manufactured by depositing a polymer through polymerization between sulfur and a monomer using a chemical vapor deposition process using gas-phase sulfur as an initiator, i.e. an sCVD process, it is possible to manufacture a polymer that is capable of being polymerized with a monomer having low miscibility and that has a low sulfur rank, thereby having a very high refractive index and transmittance.

In one aspect, therefore, the present invention relates to a method of preparing a polymer film using chemical vapor deposition using sulfur as an initiator (sCVD), the method including: (a) introducing a gas-phase monomer and solid-phase sulfur into an sCVD reactor; (b) vaporizing the solid-phase sulfur by heating to obtain gas-phase sulfur and mixing the gas-phase sulfur and the monomer; and (c) heating a substrate to adsorb and polymerize the sulfur and the monomer on the substrate, and thereby depositing a sulfur-containing polymer on the substrate.

Also, in another aspect, the present invention relates to a polymer film of a sulfur-containing copolymer, wherein the polymer film has a refractive index of 1.7 to 1.9, a transmittance of 90% or more in the visible spectrum, a sulfur content of 60 to 80 wt %, and a sulfur rank of 2.0 to 8.0, and is coated with a sulfur containing polymer selected from the group consisting of poly(sulfur-co-1,4-butanediol divinyl ether) (SBDDVE), poly(sulfur-co-di(ethylene glycol)divinyl ether) (SDEGDVE), poly(sulfur-co-divinyl benzene) (SDVB), poly(sulfur-co-1,9-decadiene) (SDDE), poly(sulfur-co-1,11-dodecadiene) (SDDDE), poly(sulfur-co-1,3,5-trivinyl-1,3,5-trimethyl cyclotrisiloxane) (SV3D3), poly (sulfur-co-1,3,5,7-tetravinyl-1,3,5,7-tetramethylcyclotetrasiloxane) (SV4D4), and poly(sulfur-co-hexavinyldisiloxane) (SHVDS), the sulfur containing polymer having a thickness of 10 nm to 2 μm.

In the present invention, polymer deposition was successfully performed in a gas phase without an initiator by mixing gas-phase sulfur and a monomer in a chamber. Unlike a conventional liquid-phase process, a gas-phase process in which gas-phase sulfur and a monitor are mixed with each other in a vacuum state is performed, whereby it is possible to polymerize any of various monomers that are not mixed with liquid-phase sulfur into a polymer. In addition, when a thin polymer film is deposited, application to various substrates is possible without damage. Furthermore, it is possible to manufacture a very thin film, and deposition on a complex structure, which is impossible in a liquid-phase process, is possible.

The present invention is characterized in that, in order to synthesize various polymer materials through processing of sulfur, polymerization is performed using gas-phase sulfur. FIG. 1 shows an overall schematic diagram of a chemical vapor deposition process using sulfur as an initiator (sCVD) and a reaction scheme. Sulfur, which exists in a ring state at room temperature, is evaporated by heating and is changed into radical-state linear sulfur through thermal hemolytic ring opening so as to be used as an initiator configured to initiate polymerization. Unlike a conventional inverse vulcanization reaction in a liquid phase, a monomer and sulfur radicals are mixed with each other in a gas phase, whereby there is no danger of phase separation, which is one of the advantages thereof. Consequently, it is possible to polymerize any of various monomers and sulfur into a copolymer, and two or more kinds of monomers may be provided together, whereby synthesis of various polymers is possible. Furthermore, sulfur may be used as a monomer for a copolymer in polymerization, rather than simply as an initiator, whereby it is possible to produce a polymer having a high content of sulfur at the time of deposition with a monomer capable of crosslinking.

As shown in FIG. 2A, a conformal film is formed even in a nano-size pattern, and it was confirmed through AFM analysis that a very flat film is synthesized. This means that sCVD has the advantage of vapor deposition, like other vapor deposition methods, such as initiated chemical vapor deposition (iCVD) and atomic layer deposition (ALD), which are capable of depositing a uniform thin film on any of three-dimensional (3D) substrates having various structures.

FIG. 2B is a line-based list of monomers successfully synthesized in the present invention. Various sulfur containing polymers were successfully synthesized using butanediol divinyl ether (BDDVE), di(ethylene glycol)divinyl ether (DEGDVE), divinylbenzene (DVB), 1,9-decadiene (DDE), 1,11-dodecadiene (DDDE), 1,3,5-trimethyl-1,3,5-trivinyl cyclotrisiloxane (V3D3), 1,3,5,7-tetravinyl-1,3,5,7-tetramethyl cyclotetrasiloxane (V4D4), or hexavinyldisiloxane (HVDS), and deposition of a thin film type copolymer was successfully performed. The synthesized polymers were named as follows: poly(sulfur-co-1,4-butanediol divinyl ether) (SBDDVE), poly(sulfur-co-di(ethylene glycol)divinyl ether) (SDEGDVE), poly(sulfur-co-divinyl benzene) (SDVB), poly(sulfur-co-1,9-decadiene) (SDDE), poly(sulfur-co-1,11-dodecadiene) (SDDDE), poly(sulfur-co-1,3,5-trivinyl-1,3,5-trimethyl cyclotrisiloxane) (SV3D3), poly(sulfur-co-1,3,5,7-tetravinyl-1,3,5,7-tetramethylcyclotetrasiloxane) (SV4D4), and poly(sulfur-co-hexavinyldisiloxane) (SHVDS). In particular, the monomer that was used is a crosslinked polymer that has two or more vinyl groups and is capable of crosslinking in a network structure at the time of bonding with sulfur.

For polymer deposition, a monomer is heated into a gas-phase monomer, and the gas-phase monomer is introduced into a chamber in a vacuum state. At the same time, solid-phase sulfur is vaporized in the chamber by heating, and the two kinds of gases, i.e. the sulfur and the monomer, are mixed with each other in a gas phase. A filament in the chamber is heated to a high temperature such that the vaporized sulfur is capable of generating radicals, and a target substrate is heated to about 110 to 130° C., which is lower than the temperature of the other parts, to adsorb the sulfur and the monomer, whereby polymerization is achieved.

In the present invention, the polymer may be poly(sulfur-co-1,4-butanediol divinyl ether) (SBDDVE), poly(sulfur-co-di(ethylene glycol)divinyl ether) (SDEGDVE), poly(sulfur-co-divinyl benzene) (SDVB), poly(sulfur-co-1,9-decadiene) (SDDE), poly(sulfur-co-1,11-dodecadiene) (SDDDE), poly(sulfur-co-1,3,5-trivinyl-1,3,5-trimethyl cyclotrisiloxane) (SV3D3), poly(sulfur-co-1,3,5,7-tetravinyl-1,3,5,7-tetramethylcyclotetrasiloxane) (SV4D4), or poly(sulfur-co-hexavinyldisiloxane) (SHVDS).

The above process may be performed at a substrate temperature of 90 to 140° C., preferably 110 to 130° C. and a pressure of 500 to 1500 mTorr for 5 minutes to 2 hours. In the case in which the substrate temperature is lower than 90° C., foggy deposition may result. In the case in which the substrate temperature is higher than 140° C., the reactant may not be adsorbed, whereby no film may be formed. In the case in which the pressure of the chamber in the reactor is lower than 500 mTorr or higher than 1500 mTorr, no deposition may be achieved or the deposited film may be contaminated. In addition, there are problems in that the amount of sulfur is proportional to the deposition thickness and in that recrystallization occurs in the film depending on reaction conditions.

Also, in the present invention, a step of heating the filament in the reactor to a temperature of 330 to 380° C. may be further included after step (b). In addition, the substrate may be heated to a temperature of 110 to 130° C. in step (c).

In the present invention, the monomer is a monomer having a vinyl group, and at least one selected from the group consisting of butanediol divinyl ether (BDDVE), di(ethylene glycol)divinyl ether (DEGDVE), divinylbenzene (DVB), 1,9-decadiene (DDE), 1,11-dodecadiene (DDDE), 1,3,5-trimethyl-1,3,5-trivinyl cyclotrisiloxane (V3D3), 1,3,5,7-tetravinyl-1,3,5,7-tetramethylcyclotetrasiloxane (V4D4), and hexavinyldisiloxane (HVDS) is used as the monomer; however, the present invention is not limited thereto.

The thickness and the refractive index of the polymer are increased in proportion to the amount of sulfur that is introduced into step (a).

The thickness of the polymer may be adjusted within a range of 10 nm to 2 μm.

The substrate may be one selected from the group consisting of silicon wafer, glass, polyethylene terephthalate (PET), polyethylene naphthalate (PEN), polydimethyl siloxane (PDMS), polyimide (PI), latex, porous stainless steel mesh, polyacrylonitrile, polydimethylsiloxane, polyethersulfone (PES), polysulfone (PSF), and poly(vinylidene difluoride) (PVDF).

FIG. 3 shows the results of FT-IR and XPS analyses of a sulfur containing polymer synthesized using sCVD. In FT-IR analysis, a monomer, a polymer deposited using iCVD, and a polymer deposited using sCVD were compared with each other with regard to the absorption peaks thereof. However, BDDVE, DEGDVE, DDE, and DDDE were excluded, since these materials are not capable of performing homopolymerization and thus cannot be deposited using iCVD. For all of the monomers, the polymer deposited using iCVD, and the polymer deposited using sCVD, a functional group of each monomer was successfully observed, and only for the polymer deposited using sCVD, an S—S stretching peak was observed in the vicinity of 480 $cm^{-1}$, and a C—S stretching peak was observed at 1080 cm'. This means that a reaction between all monomers and sulfur was successfully performed through the sCVD process. In XPS analysis, the bonding state of elements constituting a polymer, SBDDVE, synthesized using sCVD was confirmed through quantitative analysis and high-resolution measurement of each element. C—C—O, C—C—C, C—C—S, and O—C—S peaks were confirmed at a C is peak and an O 1s peak. This means that a monomer, BDDVE, was synthesized into a polymer without damage. It was confirmed through high-resolution measurement of an S 2p peak that an S—S bond and an S—C bond coexist. It can be seen from the results of FT-IR and XPS analyses that the component of a produced polymer thin film is a material produced through chemical bonding between sulfur and a monomer, rather than self-deposition due to generation of the monomer or heat.

In the present invention, the "sulfur rank" does not mean a bond length in sulfur but means the number of sulfur atoms bonded to each other in a bond interconnecting monomers in a polymer (no units), and preferably has a range of 2.0 to 8.0, more preferably 3.0 to 7.5.

FIG. 4 shows a sulfur rank in a polymer polymerized using sCVD calculated through the results of XPS analysis and an S2p high-resolution graph. When the S2p high-resolution graph was deconvoluted, it was possible to obtain the C—S/S—S ratio of the polymer, based on which it is possible to calculate a sulfur rank in the polymer (from S2p). In addition, on the assumption that a single vinyl group forms two C—S bonds and there is no vinyl group remaining in a monomer after polymerization, it is possible to calculate an average sulfur rank in the polymer through an element ratio (from survey). It can be seen that there is little difference between the sulfur rank calculated through deconvolution and the sulfur rank calculated through the element ratio, which means that there are few unreacted vinyl groups remaining in the synthesized polymer, as was assumed above, the formed sulfur rank is low, and that a high degree of crosslinking is exhibited. This shows that it is possible to solve problems of low long-term stability due to high sulfur rank and color appearance, which was caused in the inverse vulcanization reaction, through the sCVD process developed in the present invention.

FIG. 5 is a view showing the results of XRD, TGA, and DSC analyses of a sulfur containing polymer synthesized using sCVD. In XRD analysis, sulfur has crystallinity and thus exhibits a crystalline peak at a specific angle, whereas SBDDVE synthesized using sCVD has no crystallinity at any angle and is amorphous. According to the result of DSC analysis, it was confirmed that elemental sulfur has a melting point of about 110° C. to 130° C. and thus exhibits a heat absorption peak, whereas SBDDVE synthesized using sCVD does not exhibit a corresponding peak. In addition, a $T_g$ value thereof is very high, compared to sulfur having a $T_g$ value in the vicinity of −30° C. According to the result of TGA analysis, it can be seen that sulfur is completely decomposed at 300° C. to 400° C., whereby the mass % thereof reaches 0%, whereas the mass % of SBDDVE remains even at 500° C. or higher. This means that an S—S bond is completely decomposed but a C—C/C—S bond remains. These three analysis results reveal that there is no unreacted sulfur in a sulfur containing polymer synthesized using sCVD and that a reactant is successfully bonded with a monomer.

In the present invention, it can be seen from the results of analysis of optical properties of a polymer synthesized using sCVD that the polymer synthesized using sCVD has a very high refractive index as a polymer material and that there is little extinction in the visible spectrum. In actuality, it was confirmed that, when the transmittance of the polymer is measured at a thickness of 1 μm or more, a transmittance of 90% or more is exhibited. This is a feature distinguished from a sulfur containing polymer synthesized through conventional inverse vulcanization, and is assumed to be a feature achieved as the result of homogenous mixing in a gas phase. A transmittance of 90% or more, preferably 90 to 99%, may be achieved.

In addition, refractive index and thickness may be adjusted through the sCVD process. The refractive index is adjusted to a range from the low 1.7 to the low 1.9, which is a very high value for a polymer material. To date, no polymer material that is transparent and has a refractive index within the above range has been disclosed.

In the present invention, sulfur and a monomer may be injected into a vacuum chamber in a gas phase to deposit a polymer having a high content of sulfur. This technology is expected d to be applicable in novel ways to various fields, such as those of conventional batteries, lenses, and insulation films.

In the present invention, it was confirmed that, as the result of design to synthesize a sulfur containing polymer, as shown in FIG. 7, it is possible to synthesize a sulfur containing polymer having excellent physical properties using a chemical vapor deposition apparatus using sulfur as an initiator.

In another aspect, therefore, the present invention relates to an apparatus for manufacturing a polymer film using chemical vapor deposition using sulfur as an initiator (sCVD), the apparatus including: (a) an sCVD reactor 10; (b) a sulfur loading source cell 100 installed at the lower end of the sCVD reactor 10, the sulfur loading source cell 100 being configured to load solid-phase sulfur into the reactor 10, the sulfur loading source cell 100 being heated to vaporize sulfur during processing; (c) a monomer loading unit 200 connected to the upper end of the sCVD reactor 10, the monomer loading unit 200 being configured to heat an introduced monomer such that the monomer has sufficient vapor pressure and to move the gas-phase monomer into the sCVD reactor 10; (d) a filament 300 made of a high-temperature metal alloy wire, the filament 300 being configured to lower the sulfur rank of the gas-phase sulfur vaporized from the sulfur loading source cell 100 and to move the vaporized sulfur to a substrate 400; and (e) the substrate 400 being mounted such that the upper surface of the substrate 400 faces the lower part of the sCVD reactor 10, the monomer moved from the monomer loading unit 200 of (c) into the sCVD reactor 10 being adsorbed on the upper surface of the substrate 400, whereby a synthesis reaction between the vaporized sulfur and a polymer occurs on the substrate 400.

A chemical vapor deposition apparatus for synthesizing a sulfur containing polymer using sulfur as an initiator is shown in FIG. 7. The apparatus according to the present invention generally includes four units.

(A) Sulfur Loading Source Cell 100

This unit is a source cell configured to load sulfur. In a system according to the present invention, the source cell is capable of loading up to 3 g of elemental sulfur, and is made of a ceramic material so as to withstand high temperatures. A line heater is disposed in the vicinity of the source cell, and this heater is used to adjust the temperature of the source cell. The heater that is used may also set a heating rate, and may increase temperature to a maximum of about 350° C. The heating rate and the temperature have an influence on the vaporization rate and vaporization amount of sulfur. At an appropriate heating rate and temperature, sulfur is uniformly transmitted to the substrate, on which synthesis of a sulfur containing polymer having excellent physical properties is performed.

(B) Monomer Loading Unit 200

This is a unit configured to load a monomer which will react with sulfur. A maximum of about 30 ml of a monomer is contained in a small tank made of stainless steel (SUS), and is fastened to a line extending from the reactor such that the monomer is used. A monomer having lower vapor pressure than sulfur is used, and is sufficiently heated using a heater such that the monomer is injected into the reactor in a gas phase. Heating temperature varies depending on a monomer that is used, and heating is performed within a temperature range of about 20 to 120° C. A ball valve and a needle valve are provided above the connection line with the sCVD reactor 10.

In order to prevent a vaporized monomer from being adsorbed on the line interconnecting the reactor and the monomer fastening portion, the line interconnecting the fastening portion and the reactor is also heated to a temperature range of about 80 to 110° C. using a heater. A Baratron sensor is provided in the sCVD reactor 10, and the amount of monomer to be injected is set based on pressure measured by the Baratron sensor.

(C) Filament 300

The filament is a unit configured to allow vaporized sulfur to pass therethrough, and is made of a Cr/Ni wire. The filament may be heated to a temperature of 400° C. The filament lowers the sulfur rank of gas-phase sulfur vaporized from the sulfur loading source cell 100. Also, in this apparatus, the height of the filament (the distance from the sulfur loading source cell to the substrate) may be flexibly adjusted, and synthesis of a sulfur containing polymer having excellent physical properties is performed at an appropriate position.

(D) Substrate 400

In general, a stainless steel (SUS) substrate having a size of 10*10 is used, and detachment and attachment of the substrate are possible in the apparatus. The apparatus is configured to have a structure in which a target material is fixed to the substrate and then the substrate is mounted so as to face downwards. The position of the mounted substrate is also flexibly adjustable, in the same manner as the filament, and the substrate is designed so as to be rotatable. Through rotation of the substrate, sulfur vaporized from the source cell under the substrate may be uniformly deposited on the substrate, whereby it is possible to synthesize a sulfur containing polymer having excellent physical properties.

Hereinafter, the present invention will be described in more detail with reference to examples. However, it will be obvious to those skilled in the art that these examples are provided only for illustration of the present invention and should not be construed as limiting the scope of the present invention.

EXAMPLE

Preparation Example 1: Preparation of poly(sulfur-co-1,4-butanediol divinyl ether) (SBDDVE) using sCVD 10 ml of a monomer, butanediol divinyl ether (BDDVE), was heated to 60° C. to obtain a gas-phase monomer, and the gas-phase monomer was introduced into the chamber in a vacuum state. At the same time, 0.01 g to 1.5 g of solid-phase sulfur was vaporized in the chamber by heating to 180° C., and the two kinds of gases, i.e. the sulfur and the monomer, were mixed with each other in a gas phase. The filament in the chamber was heated to a high temperature (350° C.) such that the vaporized sulfur was capable of generating radicals, and a target substrate was heated to about 110 to 130° C. to polymerize the sulfur and the monomer with each other, whereby a polymer film having SBDDVE deposited thereon was manufactured. The pressure in the chamber was maintained at 500 to 1500 mTorr.

Preparation Example 2: Preparation of poly(sulfur-co-di(ethylene glycol)divinyl ether) (SDEGDVE)

SDEGDVE was manufactured in the same manner as in Preparation Example 1 except that a polymer film having SDEGDVE deposited thereon was manufactured using di(ethylene glycol)divinyl ether (DEGDVE) as a monomer.

Preparation Example 3: Preparation of poly(sulfur-co-divinyl benzene) (SDVB)

SDVB was manufactured in the same manner as in Preparation Example 1 except that a polymer film having SDVB deposited thereon was manufactured using divinylbenzene (DVB) as a monomer.

Preparation Example 4: Preparation of poly(sulfur-co-1,9-decadiene) (SDDE)

SDDE was manufactured in the same manner as in Preparation Example 1 except that a polymer film having SDDE deposited thereon was manufactured using 1,9-decadiene (DDE) as a monomer.

Preparation Example 5: Preparation of poly(sulfur-co-1,11-dodecadiene) (SDDDE)

SDDDE was manufactured in the same manner as in Preparation Example 1 except that a polymer film having SDDDE deposited thereon was manufactured using 1,11-dodecadiene (DDDE) as a monomer.

Preparation Example 6: Preparation of poly(sulfur-co-1,3,5-trivinyl-1,3,5-trimethyl cyclotrisiloxane) (SV3D3)

SV3D3 was manufactured in the same manner as in Preparation Example 1 except that a polymer film having SV3D3 deposited thereon was manufactured using 1,3,5-trimethyl-1,3,5-trivinyl cyclotrisiloxane (V3D3) as a monomer.

Preparation Example 7: Preparation of poly(sulfur-co-1,3,5,7-tetravinyl-1,3,5,7-tetramethylcyclotetrasiloxane) (SV4D4)

SV4D4 was manufactured in the same manner as in Preparation Example 1 except that a polymer film having SV4D4 deposited thereon was manufactured using 1,3,5,7-tetravinyl-1,3,5,7-tetramethylcyclotetrasiloxane (V4D4) as a monomer.

Preparation Example 8: Preparation of poly(sulfur-co-hexavinyldisiloxane) (SHVDS)

SHVDS was manufactured in the same manner as in Preparation Example 1 except that a polymer film having SHVDS deposited thereon was manufactured using hexavinyldisiloxane (HVDS) as a monomer.

Comparative Example 1: Preparation of poly(divinyl benzene) (pDVB) using iCVD

Polymerization was performed using a monomer, divinyl benzene (DVB) (99%, Aldrich, USA), and an initiator, tert-butyl peroxide (TBPO) (98%, Aldrich, USA). The monomer and the initiator were used without refinement. The vaporized monomer and initiator were injected into an iCVD reactor (Daeki Hi-Tech Co., Ltd). In order to obtain vapor flow, TBPO was maintained at room temperature, and DVB was heated to 40° C.

The feeding rates of DVB and TBPO were set to 1.679 and 0.613 sccm, respectively, and the pressure of the reactor and the temperature of the substrate were maintained at 250 mTorr and 38° C., respectively. The temperature of the filament was set to 140° C.

Comparative Example 2: Preparation of poly(1,3,5-trivinyl-1,3,5-trimethyl cyclotrisiloxane) (pV3D3) using iCVD A polymer, poly(1,3,5-trivinyl-1,3,5-trimethyl cyclotrisiloxane) (pV3D3), was manufactured as follows. In order to obtain the vapor flow of V3D3 and TBPO in the iCVD reactor, TBPO was maintained at room temperature, and V3D3 was heated to 40° C. The feeding rates of V3D3 and TBPO were set to 4.12 and 1.61 sccm, respectively. The pressure of the reactor and the temperature of the substrate were maintained at 300 mTorr and 40° C., respectively. The temperature of the filament was set to 140° C.

Comparative Example 3: Preparation of poly(1,3,5,7-tetravinyl-1,3,5,7-tetramethylcyclotetrasiloxane) (pV4D4) using iCVD A polymer, poly(1,3,5,7-tetravinyl-1,3,5,7-tetramethylcyclotetrasiloxane, was manufactured as follows. In order to obtain the vapor flow of V4D4 and TBPO in the iCVD reactor, TBPO was maintained at room temperature, and V4D4 was heated to 70° C. The feeding rates of V4D4 and TBPO were set to 0.93 and 0.67 sccm, respectively. The pressure of the reactor and the temperature of the substrate were maintained at 145 mTorr and 40° C., respectively. The temperature of the filament was set to 140° C.

Comparative Example 4: Preparation of poly(hexavinyldisiloxane) (pHVDS) using iCVD A polymer, poly(hexavinyldisiloxane) (pHVDS), was manufactured as follows. In order to obtain the vapor flow of HVDS and TBPO in the iCVD reactor, TBPO was maintained at room temperature, and HVDS was heated to 40° C. The feeding rates of HVDS and TBPO were set to 0.99 and 0.74 sccm, respectively. The pressure of the reactor and the temperature of the substrate were maintained at 200 mTorr and 30° C., respectively. The temperature of the filament was set to 140° C.

Example 1: Analysis of Polymers Manufactured Using sCVD and iCVD

FIG. 2 shows the results of AFM analysis of a film synthesized using sCVD. A phase image shows that no phase separation occurred and a film was successfully synthesized, and it can be seen from a height image that a film having a low surface roughness of 0.365 nm, i.e. a very flat film, was formed. FIG. 3 shows the results of FT-IR and XPS analyses of a sulfur containing polymer synthesized using sCVD. In FT-IR analysis, absorption peaks of a monomer, a polymer deposited using iCVD, and a polymer deposited using sCVD were compared with each other. However, BDDVE, DEGDVE, DDE, and DDDE were excluded, since these materials are not capable of performing homo-polymerization and thus cannot be deposited using iCVD. For all of the monomer, the polymer deposited using iCVD, and the polymer deposited using sCVD, a functional group of each monomer was successfully observed, and only for the polymer deposited using sCVD, an S—S stretching peak was observed in the vicinity of 480 $cm^{-1}$, and a C—S stretching peak was observed at 1080 cm'. This means that reaction between all monomers and sulfur was successfully performed through the sCVD process. In XPS analysis, the bonding state of elements constituting a polymer, SBDDVE, synthesized using sCVD was confirmed through quantitative analysis and high-resolution measurement of each element. C—C—O, C—C—C, C—C—S, and O—C—S peaks were confirmed at a C is peak and an O 1s peak. This means that a monomer, BDDVE, was synthesized into a polymer without damage. It was confirmed through high-resolution measurement of an S 2p peak that an S—S bond and an S—C bond coexist. It can be seen from the results of FT-IR and XPS analyses that the component of a produced polymer thin film is a material produced through chemical bonding between sulfur and a monomer, rather than self-deposition due to generation of the monomer or heat.

Example 2: Analysis of Sulfur Rank of Polymers Manufactured Using sCVD

FIG. 4 shows sulfur rank in a polymer polymerized using sCVD calculated through the results of XPS analysis and an S2p high-resolution graph. When the S2p high-resolution graph was deconvoluted, it was possible to obtain the C—S/S—S ratio of the polymer, through which it is possible to calculate sulfur rank in the polymer (from S2p). In addition, on the assumption that a single vinyl group forms two C—S bonds and there is no vinyl group remaining in a monomer after polymerization, it is possible to calculate average sulfur rank in the polymer through an element ratio (from survey). It can be seen that there is little difference between the sulfur rank calculated through deconvolution and the sulfur rank calculated through the element ratio, and this means that there are few unreacted vinyl groups remaining in the synthesized polymer, as assumed above, that the formed sulfur rank is low, and that a high degree of cross-linking is exhibited. This shows that it is possible to solve problems of low long-term stability due to a high sulfur rank and color appearance, which was caused in the inverse vulcanization reaction, through the sCVD process developed in the present invention.

Example 3: Analysis of Crystallinity of Polymers Manufactured Using sCVD

FIG. 5 is a view showing the results of XRD, TGA, and DSC analyses of a sulfur containing polymer synthesized using sCVD. In XRD analysis, sulfur is crystalline and thus exhibits a crystalline peak at a specific angle, whereas SBDDVE synthesized using sCVD is not crystalline at any angle and is amorphous. According to the result of DSC analysis, it was confirmed that sulfur has a melting point at about 110° C. to 130° C. and thus exhibits a heat absorption peak, whereas SBDDVE synthesized using sCVD does not exhibit a corresponding peak. In addition, a $T_g$ value thereof is very high, compared to sulfur having a $T_g$ value in the vicinity of −30° C. According to the result of TGA analysis, it can be seen that sulfur is completely decomposed at 300° C. to 400° C., whereby the mass % thereof reaches 0%, whereas the mass % of SBDDVE remains even at 500° C. or higher. This means that an S—S bond is completely decomposed but a C—C/C—S bond remains. These three analysis results reveal that there is no unreacted sulfur in a sulfur containing polymer synthesized using sCVD and that a reactant is successfully bonded with a monomer.

Example 4: Analysis of Optical Properties of Polymers Manufactured Using sCVD FIG. 6 shows the optical properties of polymers synthesized using sCVD. This shows that each polymer synthesized using sCVD has a very high refractive index as a polymer material and that there is little extinction in the visible spectrum. In actuality, it was confirmed that, when the transmittance of each polymer is measured at a thickness of 1 μm or more, a transmittance of 90% or more is exhibited in visible range. This is a feature distinguished from a sulfur containing polymer synthesized through conventional inverse vulcanization, and is presumed to be a feature achieved as the result of homogenous mixing in a gas phase. In addition, as can be seen from the right graph of FIG. 5, it was possible to adjust a refractive index and a thickness through the sCVD process. The refractive index was adjusted to a range from the low 1.7 to the high 1.9, which is a very high value for a polymer material. To date, no polymer material that is transparent and has a refractive index within the above range has been disclosed.

INDUSTRIAL APPLICABILITY

In a method of preparing a polymer film using sCVD according to the present invention, a monomer and sulfur radicals are mixed with each other in a gas phase, unlike a conventional inverse vulcanization reaction in a liquid phase, whereby there is no danger of phase separation, and it is possible to polymerize any of various monomers and sulfur into a copolymer. In addition, two or more kinds of monomers may be provided together, whereby synthesis of various polymers is possible. Furthermore, sulfur may be used as a monomer for a copolymer in polymerization in addition to the function of an initiator, whereby it is possible to produce a polymer having a high content of sulfur at the time of deposition with a monomer capable of crosslinking.

In addition, sulfur and a monomer may be injected into a vacuum chamber in a gas phase to deposit a polymer having a high content of sulfur using various monomers, whereby it is possible to synthesize a transparent sulfur containing polymer. This is expected to be applicable in novel ways to various fields, such as those of conventional batteries, lenses, and insulation films.

Although specific configurations of the present invention have been described in detail, those skilled in the art will appreciate that preferred embodiments are given for illustrative purposes in the description and should not be construed as limiting the scope of the present invention. Therefore, the substantial scope of the present invention is defined by the accompanying claims and equivalents thereto.

The invention claimed is:

1. A polymer film which is coated with a sulfur-containing copolymer, wherein the polymer film has a refractive index of 1.7 to 1.9, a transmittance of 90 to 99.9% in a visible spectrum, a sulfur content of 60 to 80 wt %, and a sulfur rank of 2.0 to 8.0, and the sulfur-containing copolymer is selected from the group consisting of poly (sulfur-co-1,9-decadiene) (SDDE) and poly (sulfur-co-1,11-dodecadiene) (SDDDE).

2. The polymer film coated with a sulfur-containing copolymer according to claim 1, wherein the polymer film further comprises a substrate comprising one selected from the group consisting of silicon wafer, glass, polyethylene terephthalate (PET), polyethylene naphthalate (PEN), polydimethyl siloxane (PDMS), polyimide (PI), latex, porous stainless steel mesh, polyacrylonitrile, polydimethylsiloxane, polyethersulfone (PES), polysulfone (PSF), and poly(vinylidene difluoride) (PVDF).

3. A method of preparing a polymer film coated with a sulfur-containing copolymer according to claim 1, using chemical vapor deposition using sulfur as an initiator (sCVD), the method comprising:

(a) introducing a gas-phase monomer and solid-phase sulfur into an sCVD reactor;

(b) vaporizing the solid-phase sulfur by heating to obtain gas-phase sulfur and mixing the gas-phase sulfur and the monomer;

(c) heating a filament in the reactor to a temperature of 330 to 380° C.; and (d) heating a substrate to adsorb and polymerize the sulfur and the monomer on the substrate, and thereby depositing a sulfur-containing polymer on the substrate, wherein the polymer film is coated with a sulfur-containing copolymer, wherein the polymer film has a refractive index of 1.7 to 1.9, a transmittance of 90 to 99.9% in a visible spectrum, a sulfur content of 60 to 80 wt %, and a sulfur rank of 2.0 to 8.0, and the sulfur-containing copolymer is selected from a group consisting of poly(sulfur-co-1,9-decadiene) (SDDE) and poly(sulfur-co-1,11-dodecadiene) (SDDDE).

4. The method of preparing a polymer film of claim 3, wherein the method is performed at a substrate temperature of 90 to 140° C. and a pressure of 500 to 1500 mTorr for 5 minutes to 2 hours.

5. The method of preparing a polymer film of claim 3, wherein the substrate is heated to a temperature of 110 to 130° C. in step (c).

6. The method of preparing a polymer film of claim 3, wherein the monomer is at least one selected from the group consisting of 1,9-decadiene (DDE) and 1,11-dodecadiene (DDDE).

7. The method of preparing a polymer film of claim 3, wherein the sulfur-containing polymer has a thickness of 1 nm to 10 μm.

* * * * *